3,099,549
METHOD OF JOINING TWO GLASS BODIES
Joseph John Domicone, Elmira, and William C. Smith, Corning, N.Y., assignors to Corning Glass Works, Corning, N.Y., a corporation of New York
Filed Nov. 14, 1958, Ser. No. 773,927
5 Claims. (Cl. 65—30)

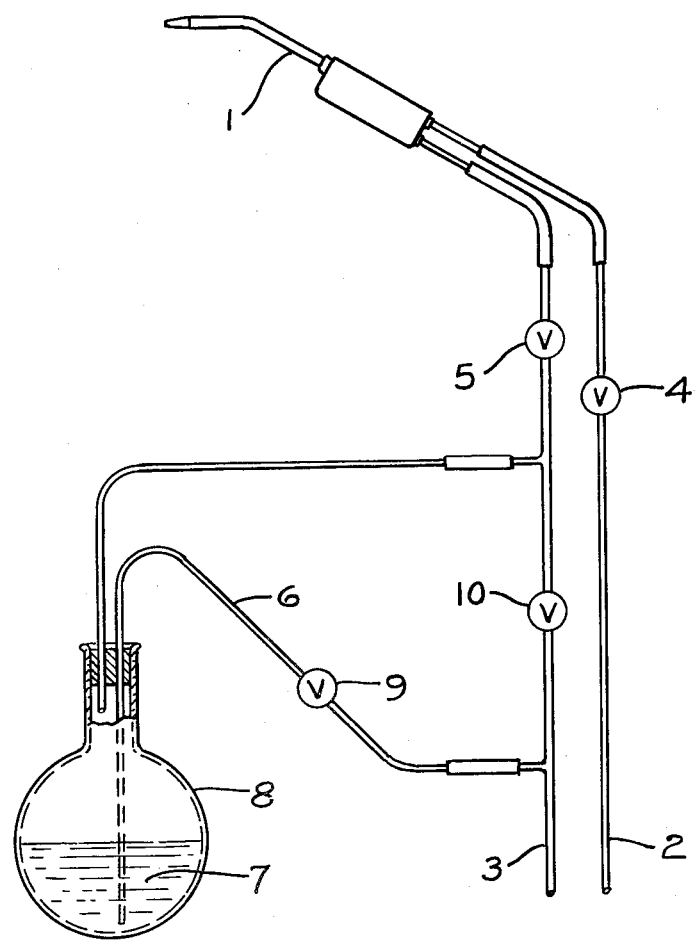

This invention relates to a method for suppressing reboil on glass surfaces during lampworking.

Lampworkers frequently observe the appearance of bubbles at or near the surface of glass bodies, which in their hardened state had appeared to be gas- and bubble-free, as such bodies are heated in a flame for softening them preparatory to reshaping or joining to other bodies. This bubbling, known as reboil, is undesirable not only because of its adverse effect on the appearance of such reheated bodies but, more importantly, because the bubbles make it extremely difficult, if not impossible, to form strong reliable seals.

The principal object of this invention is to suppress reboil on glass surfaces when the glass is reheated in a gas flame.

The accompanying drawing illustrates a suitable apparatus for a preferred method of the invention.

We have found that the principal object may be attained when the glass surface being lampworked has applied thereto at least one glass-network-forming oxide selected from the group consisting of silica and boric oxide. Such oxide may be applied to the surface of the glass as a compound of silicon or boron which is thermally decomposed by the lampworking flame to the corresponding oxide, the remainder of the decomposition products being volatile, or by adding such a compound to the combustible mixture from which the lampworking flame is produced. In either method, the oxide is applied to the surface prior to the time the glass reaches a temperature high enough to lamp-work it.

Any compound of silicon or boron which will be converted by the lampworking flame to $SiO_2$ or $B_2O_3$ respectively, and the remainder of the decomposition products being volatile, is satisfactory for the present purpose. Thus silicon compounds such as silanes ($SiH_4$, $Si_2H_6$, etc.), chlorosilanes such as $MeSiCl_3$, silicones, silicohalides ($SiCl_4$, $SiF_4$, $SiBr_4$, $SiI_4$, $SiCl_3H$, etc.), organic silicates (($C_2H_5O)_4Si$), ortho- and disilicic acid, silica soot, and boron compounds, such as ortho-, meta-, and tetra-boric acid, boranes ($B_2H_6$, $B_4H_{10}$, $B_5H_9$, etc.) and boron halides ($BCl_3$, $BF_3$, etc.) are suitable for the present purpose. Compounds containing halogens, while suitable for the present purposes, are not preferred as they thermally decompose to produce toxic fumes, such as HCl and HF, and, furthermore, these fumes may attack the glass surface.

The compounds of silicon or boron suitable for suppressing reboil may be deposited on the glass prior to the application of heat thereto but are preferably applied by including the compounds in the constituents of the gaseous fuel mixture so that they are applied concurrently with the heating step. However, it has been found that when the compounds are applied to the surface of the glass prior to heating, such as by dipping the glass into a liquid containing the compound or by fuming or spraying the compound on to the surface of the glass, a residue remains in the vicinity of the softened glass which must subsequently be removed by washing to restore the original luster to the glass surface. Therefore, it is preferable to incorporate the compound into the gas mixture such as by bubbling at least some of the constituents of the gas mixture through a solution containing a suitable compound of boron or silicon, or a mixture of such compounds.

The following are examples of methods according to this invention for suppressing reboil in glass:

*Example I*

Two inches of one end each of two pieces of glass tubing were dipped in a 5% boric acid solution and then allowed to dry in the air. The two coated ends were then heated in a gas flame according to normal lampworking procedures and joined. No reboil was observed.

*Example II*

Silicon tetrachloride was decomposed by burning in a burner in the usual fashion and the fuming silica soot was deposited on one end each of two pieces of glass tubing. The two coated ends were then heated in a gas flame according to normal lampworking procedures and joined. No reboil was observed.

*Example III*

Two inches of one end each of two pieces of glass tubing were heated to 200–220° C. and sprayed with ethylorthosilicate. The two coated ends were then heated in a gas flame according to the normal lampworking procedures and joined. No reboil was observed.

Mixtures of boron and silicon compounds which are individually suitable are also satisfactory in combination for suppressing reboil. For example, a saturated solution of boric acid in ethylorthosilicate produces satisfactory results when used according to the method of Example III. Furthermore, boric acid may also be dissolved in ethyl alcohol and then mixed with ethylorthosilicate to provide a suitable mixture.

A standard gas-oxygen burner was adapted to introduce a suitable silicon or boron compound into the burner flame and thence onto the glass surface being heated as is shown in the accompanying FIGURE, wherein the burner 1 is supplied with oxygen and a combustible gaseous fuel, such as natural gas, from sources not shown through tubes 2 and 3, respectively. The flow of oxygen and fuel in the main line is controlled by valves 4 and 5 respectively. To accomplish the objects of this invention, a portion of the fuel is bled from the main fuel line 3 through an auxiliary line 6 and bubbled through the liquid containing the suitable compound 7 in a container 8 and then returned to the main fuel line 3. A valve 9 in the auxiliary fuel line 6 and a valve 10 in the by-passed portion of the main fuel line 3 can be regulated to control the proportion of the total fuel gas which passes through the liquid 7. Of course, it is obvious that this apparatus could be adapted to pass the oxygen through the liquid in place of or in addition to the fuel as is shown. Also, the amount of gas which must be bubbled through the solution depends upon the volatility of the boron- or silicon-containing compound, which in turn depends upon the temperature of the solution.

*Example IV*

The above described apparatus was used to introduce boric acid into the flame by placing a 5% by weight solution of $H_3BO_3$ in methyl alcohol in the container 8 and closing the valve 10 in the main gas line so that all the gas bubbled through the $H_3BO_3$ solution. Two pieces of glass tubing were joined by heating the ends of each in the resulting flame and no reboil was observed. This process introduced 7.7 mg. of $B_2O_3$ per liter of fuel gas. More dilute solutions of $H_3BO_3$ show some of the advantages of this invention in that less reboil is observed than when no $H_3BO_3$ is added to the gas mixture. More concentrated solutions of $H_3BO_3$ eliminate reboil, but such further increase in concentration produces no advantage over the 5% solution.

*Example V*

The above described apparatus was used to introduce ethylorthosilicate into the flame by placing such compound in the container 8 and adjusting valves 5 and 9 so that 12% of the gas bubbled through the liquid, which was maintained at room temperature (about 20° C.). This introduced 1.7 mg. of $SiO_2$ per liter of fuel gas. Two pieces of glass tubing were joined by heating the ends of each in the resulting flame and no reboil was observed. Bubbling less than 12% of the fuel gas through the liquid at least partially suppresses reboil and bubbling a greater percentage of the fuel gas through the liquid results in no observable improvement over the 12% quantity.

Attempts to join identical pieces of glass under the same conditions as was done for each of the respective Examples I to V given above, except that the steps of applying a glass-network-forming oxide of either $B_2O_3$ or $SiO_2$, or a mixture thereof, to the glass pieces prior to heating them to a softened condition was omitted, resulted in a considerable amount of undesirable reboil.

Although the methods illustrated by Examples I–V are all suitable for the present purposes, Example IV is the preferred mode contemplated by the inventors for carrying out this invention.

What is claimed is:

1. In the process of joining two glass bodies comprising heating each glass body to a softened condition in the flame resulting from burning a combustible fuel mixture, and joining the softened glass bodies, the improvement in the heating step which comprises adding to said fuel mixture at least one volatile compound which is thermally decomposed by said flame to a product comprising a glass-network-forming oxide selected from the group consisting of $SiO_2$ and $B_2O_3$, and joining the flame softened glass bodies to each other while in the softened condition.

2. The process of joining two glass bodies comprising heating at least a portion of each glass body to a softened condition in a flame resulting from burning a combustible fuel mixture containing at least one volatile compound which is thermally decomposed by said flame to a product comprising a glass-network-forming oxide selected from the group consisting of $SiO_2$ and $B_2O_3$, and joining the flame softened portions of each of said glass bodies while in the softened condition.

3. In the process of joining two glass bodies comprising heating at least a portion of each glass body to a softened condition in a flame resulting from burning a combustible fuel mixture, the improvement in the heating step which comprises bubbling at least a part of the constituents of said fuel mixture through a liquid containing at least one volatile compound which is thermally decomposed by said flame to a product comprising a glass-network-forming oxide selected from the group consisting of $SiO_2$ and $B_2O_3$, and joining the flame softened portions of each of said glass bodies while in the softened condition.

4. The method of claim 3 wherein the volatile compound is boric acid.

5. The method of claim 3 wherein the volatile compound is ethylorthosilicate.

References Cited in the file of this patent

UNITED STATES PATENTS

| | | |
|---|---|---|
| 1,153,859 | Bugbee | Sept. 14, 1915 |
| 2,188,121 | Smith | Jan. 23, 1940 |
| 2,238,777 | Lemmers et al. | Apr. 15, 1941 |
| 2,239,551 | Dalton et al. | Apr. 22, 1941 |
| 2,268,589 | Heany | Jan. 6, 1942 |
| 2,272,342 | Hyde | Feb. 10, 1942 |
| 2,329,632 | Marsden | Sept. 14, 1943 |
| 2,596,694 | Kegg | May 13, 1952 |
| 2,620,598 | Jobling-Purser et al. | Dec. 9, 1952 |
| 2,881,566 | Badger | Apr. 14, 1959 |